United States Patent Office 3,837,978
Patented Sept. 24, 1974

3,837,978
BARIUM ALUMINOSILICATE GLASS-CERAMICS
Robert A. Busdiecker, deceased, late of Woodville, Ohio, by Lucille I. Busdiecker, executrix, Woodville, Ohio, assignor to Owens-Illinois, Inc.
No Drawing. Filed Apr. 2, 1973, Ser. No. 347,389
Int. Cl. B44f 1/00; C03b 29/00; C04b 33/00
U.S. Cl. 161—1                                    9 Claims

ABSTRACT OF THE DISCLOSURE

Disclosed are thermally crystallizable barium aluminosilicate glass compositions containing tin oxide as a nucleant for in-situ thermal crystallization to yield transparent, translucent and opaque glass-ceramic articles containing hexacelsian as the principal crystalline phase and having a coefficient of thermal expansion in the range of from about 50 to $170 \times 10^{-7}/°$ C. (0–300° C.).

The present invention relates to glass-ceramic materials and bodies formed thereof. More particularly, the present invention relates to improved barium aluminosilicate glass-ceramics, and to techniques and methods for making same from thermally crystallizable parent glass compositions.

Glass-ceramic articles have been used in dinner ware and cooking ware applications, in chemical process equipment, in electrical components, and in many other domestic and industrial applications. Such a variety of uses is due to the wide range of chemical and physical properties which can be obtained in glass-ceramic articles, and also from the fact that conventional glass forming methods can be employed in producing the desired shape. Thus, it is often important for glass-ceramics to have a wide range of chemical and physical properties which are controllable with a reasonable degree of certainty.

The present invention provides high strength glass-ceramics which are transparent, translucent or opaque; have a coefficient of thermal expansion in the range of from 50 to $170 \times 10^{-7}/°$ C. (0–300° C.), and have electrical properties such as electrical resistivity, dielectric constant and dissipation factor which can be varied as a function of heat treatment. Specific detailed compositions and processing information is provided so that those skilled in the art can select the compositions and heat treatment to achieve the desired properties.

Glass-ceramics are frequently referred to in the art as semicrystalline ceramic materials. Glass-ceramics are made by the in-situ thermal crystallization of a parent glass body to produce a multitude of fine crystals dispersed throughout a residual glassy matrix.

Accordingly, the term "glass-ceramic" is used herein according to its conventional meaning and refers to a non-porous, semicrystalline body which is composed of at least one crystalline phase uniformly dispersed as fine crystals in random orientation in a residual glassy phase or matrix.

Barium aluminosilicate glass-ceramics have been explored in the past. For instance, U.S. Pat. 2,920,971 discloses that certain barium aluminosilicate compositions containing substantial amounts of titania can be thermally crystallized to yield glass-ceramics containing dibarium trisilicate as the crystalline phase. U.S. Pat. 3,578,470 discloses the use of $Ta_2O_5$ and $Nb_2O_5$ as nucleants for forming barium aluminosilicate glass-ceramics. U.S. Pat. 3,531,-303 discloses the production of barium aluminosilicate and other alkaline earth feldspar glass-ceramics using a specific group of nucleating agents, comprising ZnS, $V_2O_5$, $MoO_3$, $CaF_2$, $WO_3$, NiO, Au, Pt, Rh, Pd, Ir and a combination of $Fe_2O_3+FeO$. The parent glass compositions of Pat. No. 3,531,303 are in the range of 12–53% $SiO_2$, 10–58% $Al_2O_3$, 17–55% RO, wherein RO consists of at least one alkaline earth metal oxide selected from the group consisting of 17–50% SrO and 20–50% BaO and specified proportions of at least one of the aforementioned nucleants. Tin oxide is not mentioned as a nucleant in 3,531,303 and is not recognized as a nucleant for this system. U.S. Pat. 3,713,854 shows that barium aluminosilicate glass-ceramics can be nucleated with reduced silica in compositions free of $SnO_2$.

It has now been discovered that a very specific compositional range of homogeneous barium aluminosilicate parent glasses can be nucleated with tin oxide and thermally crystallized to yield translucent, transparent, and opaque glass-ceramic articles having a coefficient of expansion range which is controllable over the range of about 50 and $170 \times 10^{-7}/°$ C. (0–300° C.). The degree of translucency or opaqueness, and thermal expansion of the resulting glass-ceramic article can be predetermined and achieved with a reasonable degree of certainty as a function of the crystallizing heat treatment. The glass-ceramic articles also exhibit high strength characteristics.

The Parent Glass Compositions of invention are homogeneous, thermally crystallizable glass Compositions, thermally in-situ crystallizable to a glass-ceramic containing hexacelsian as the principal crystalline phase, said Compositions consisting essentially of a Base Glass Formulation and tin oxide as the sole essential nucleant, said tin oxide being present in the proportion of about 0.01–10 parts by weight per 100 parts by weight of said Base Glass Formulation when expressed as $SnO_2$, said Base Glass Formulation consisting of the following components in the following weight percentages:

BaO _____ 27.5–52
$Al_2O_3$ _____ 12–22
$SiO_2$ _____ 33–50 said components being present in the following weight proportions:

$$\frac{BaO}{Al_2O_3} \leq 3.58$$

$$2.25 \leq \frac{SiO_2}{Al_2O_3} \leq 3.75$$

For efficiency and economy, the tin oxide is present in the proportion of about 1 to about 8 parts by weight per 100 parts by weight of said Base Glass Formulation.

In a preferred practice of the present invention, the Base Glass Formulation consists of the following components in the following weight percentages:

|  | Percent |
|---|---|
| BaO | 30–43 |
| $Al_2O_3$ | 12–22 |
| $SiO_2$ | 45–50 |

The tin oxide nucleating agent can be added to the batch in the stannic or in the stannous state. When the tin oxide is added as stannous oxide, the major portion of it converts during melting to stannic oxide, but an appreciable portion of stannous oxide remains in the glass. Either valence state of tin oxide is effective as a nucleant. Some volatilization of the tin oxide often takes place during melting and this must be taken into account in charging the batch ingredients. This is especially true when stannous oxide is used in the batch. Of course, the degree of volatilization that occurs depends on the size of the batch and the type of heating system. Batches charged with 5 parts of tin oxide per 100 parts of Base Glass Formulation will often analyze to contain about 4 to 4.8 parts tin oxide on the same basis.

The Parent Glass Compositions can be melted in the normal manner in gas-fired furnaces, preferably using slightly oxidizing conditions, or in electric furnaces from normal, common batch materials. Electric boosting can be provided in gas-fired furnaces where desired. In the laboratory, platinum crucibles can be used. In larger furnaces, high quality refractories are employed, such as high alumina refractories.

In making the Parent Glass Compositions, batch ingredients in the proper proportions in finely divided or powdered form are intimately admixed and then melted in an electric furnace in open platinum or Pt-Rh crucibles. Melting times are generally about 20 to 25 hours although some melts are held for a few days to assure homogeneity. Melting temperatures are generally in the neighborhood of 1600° to 1650° C. The batch ingredients can be composed of any materials, either oxides or other compounds that can be converted to the desired oxide compositions in the proper proportions during melting.

Cane samples about ¼ inch in diameter are drawn from the surface of the melt for heat treatment. The Parent Glass Composition properties reported in Table II are determined from the cane samples as drawn.

The parent Glass Compositions of the invention can be crystallized in a number of ways. In one method the parent glass is simply slowly cooled after being cast, pressed, or otherwise formed into the desired shape. During the cooling, crystallization spontaneously takes place to form the glass-ceramic body. Such products can often be further heat treated to obtain further crystallization, if desired.

On the other hand, the molten Parent Glass Compositions can be shaped and cooled to form a glass article and then the crystallization effected by a heat treatment comprising nucleation, development and crystallization stages.

The heat treatment process for forming glass-ceramics from a parent glass usually includes a nucleation stage at substantially the temperature of the annealing point (viscosity $10^{13}$ poises) of the parent glass, a development stage at a temperature below the fiber softening point of the parent glass (preferably at a viscosity in the range of $10^8$ to $10^{12}$ poises) and a crystallization stage at a temperature preferably 150° F. to 300° F. above the fiber softening point of the parent glass (i.e., viscosity of $10^{7.65}$ poises).

In actual practice, it has been found that all three stages of the heating process can be accomplished by continuously advancing the temperature through regions of nucleation, development and crystallization. In many compositions of the present invention, it has been found that a "formal" development stage is not required because the time required to heat the article from the nucleation temperature to the crystallization temperature is sufficient.

In any event, the overall heat treatment chosen results in at least partially crystalline non-porous, hard, glass-ceramic body whose entire interior contains a multitude of randomly oriented, substantially homogeneously dispersed fine crystals.

As will be understood, when going from the initial or nucleation heat treatment to the higher crystallization temperature, it is usually preferred to proceed slowly enough or to stop at intermediate plateaus long enough, to effect appreciable crystallization in the intermediate temperature range, at least to such a degree that a rigid crystalline network is formed that prevents the article from slumping. Of course, in heat treating articles such as flat plates that can be cast in a mold and heat treated in the mold, the slumping problem is not important and not as much care need be exercised.

Although the specific examples show several plateaus of heat treatment temperatures, the entire heat treatment can be effected using slowly and continuously rising temperatures, and it is often desirable to employ different heating rates at various parts of the process. For instance, in the nucleation heat treatment temperature range the heating rate is usually slower than when going from this lower temperature range to the final crystallization temperature range.

Additional details for forming glass-ceramic bodies are described in U.S. Pats. 3,117,881; 3,653,862 and 3,497,366; the disclosures of which are incorporated by reference.

As determined by X-ray powder diffraction measurements, the products of the crystallization step contain hexacelsian or a hexacelsian-like crystalline phase as the principal crystalline phase. In other words, the hexacelsian or hexacelsian-like crystalline phase is present in the glass-ceramic article in much larger volume than any other crystalline phase, as determined by X-ray powder diffraction data. Hexacelsian is an hexagonal barium feldspar represented by the formula $BaO \cdot Al_2O_3 \cdot 2SiO_2$.

In most Compositions of invention, the in-situ thermal crystallization of the Parent Glass to form the glass-ceramic article can be accomplished at temperatures in the range of 500° C. to 1200° C. for time periods ranging from ¼ hours to 100 hours and longer. In cases where higher expansions are desired, heat treatments of up to 500 or 1000 hours and longer are not uncommon with the lower temperatures usually requiring the longer time periods.

Most of the glass-ceramics of invention having a coefficient of expansion in the range of about 50 to $100 \times 10^{-7}$ (0–300° C.) contain hexacelsian as the only crystalline phase. Such glass-ceramics are usually formed by heat treating at the lower temperature and shorter time period. When the heat treatment is made more severe (as by prolonging the time or raising the temperature), the coefficient of expansion of the resulting glass-ceramic will tend to be higher and is often in the range of 100 to $160 \times 10^{-7}/°$ C. (0–300° C.). It is suspected that the increase in expansion coefficient is due to the formation of cristobalite as a minor phase. The presence of cristobalite has been confirmed by X-ray diffraction analysis as indicated in the examples.

It has further been observed that the degree of transparency, translucency or opacity of the glass-ceramic is a function of the heat treatment. The parent glass is initially transparent and becomes progressively more translucent, and then apaque, as the crystallization proceeds. After prolonged heat treatment as illustrated in Sxamples 1 and 8, the glass-ceramics revert to a translucent state.

The principles of the present invention are illustrated in the examples that follow wherein all percentages are weight percentages, all parts are parts by weight, and all temperatures are in degress C. unless stated otherwise.

PROCEDURES

Compositions are prepared from reagent grade materials. The batches are separately melted in plantium crucibles in an electric furnace at temperatures in the neighborhood of 1600–1650° C. in an air atmosphere for time period ranging from several hours to several days with periodic manual stirring until a homogeneous molten glass is obtained.

Theoretical Base Glass Formulations in weight percent are set forth in Table I. These Base Glass Formulations are identified by alphabetic designation.

TABLE I.—THEORETICAL BASE GLASS FORMULATIONS
[In weight percent]

| Component | A | B | C | D | E | F | G | H | I |
|---|---|---|---|---|---|---|---|---|---|
| BaO | 40.6 | 43.7 | 47.7 | 50.9 | 38.3 | 35.7 | 33.4 | 31.0 | 41.0 |
| $Al_2O_3$ | 13.5 | 15.8 | 14.9 | 14.9 | 15.1 | 17.0 | 18.7 | 20.5 | 17.0 |
| $SiO_2$ | 45.9 | 40.5 | 37.4 | 34.2 | 46.6 | 47.3 | 47.9 | 48.5 | 42.0 |

The Parent Glass Compositions are set forth in Table II in terms of parts by weight of nucleant per hundred parts of Base Glass Formulation from Table I. Several of the properties for typical Parent Glass Compositions are also presented in Table II.

Examples 17 and 18 in Table II are shown as being batched with stannic oxide and stannous oxide respectively to illustrate that both of these valence forms are effective as nucleants. The three control samples are present to show that $TiO_2$ and $MoO_3$ are inferior to tin oxide in melting and refining glass compositions and then nucleating and crystallizing the glass compositions to form glass-ceramics.

is not as effective as tin oxide in nucleating glass-ceramics which are transparent or translucent. Furthermore, the glass-ceramic article obtained in Control 3 has an unattractive mottled gray, opaque appearance.

TABLE IV.—HEAT TREATMENT AND PROPERTIES OF GLASS-CERAMICS

| | Heat treatment, °C. (hours) | Crystalline phases | | Appearance | C. of T.E., ×10⁷ (0–300° C.) |
|---|---|---|---|---|---|
| | | Principal | Minor | | |
| Example: | | | | | |
| 2 | 732(16)+1,010(1) | Hexacelsia | | Opaque | 68 |
| 3 | 732(16)+1,010(1) | ....do | | ....do | 78 |
| 4 | 871(16)+1,010(¼) | ....do | | ....do | 95 |
| 5 | 816(16)+1,066(½) | ....do | | ....do | 61 |
| 6 | 982(16)+1,066(½) | ....do | | Transparent | 64 |
| 7 | 982(16)+1,066(½) | ....do | | Translucent | 56 |
| 9 | 927(16)+1,066(1) | ....do | | Opaque | 71 |
| 10 | 927(16)+1,010(½) | ....do | | ....do | 82 |
| 11 | 927(16)+1,010(½) | ....do | | ....do | 90 |
| 12 | 927(16)+1,010(½) | ....do | BaSiO₃ | ....do | 98 |
| 13 | 927(16)+1,066(1) | ....do | | ....do | 67 |
| 14 | 927(16)+1,066(1) | ....do | | ....do | 61 |
| 15 | 927(16)+1,066(1) | ....do | | ....do | 60 |
| 16 | 927(16)+1,066(1) | ....do | | ....do | 53 |
| 17 | 900(16)+1,066(1) | ....do | | Translucent | 77 |
| 18 | 900(16)+1,066(1) | ....do | | ....do | 74 |
| Control: | | | | | |
| 1 | 732(16)+1,010(1) | None | | Transparent | |
| 2 | 900(16)+1,066(1) | ....do | | ....do | |
| 3 | 900(16)+1,066(1) | Hexacelsian | BaMoO₄ | Mottled, gray, opaque | 80 |

In Control Sample 3 shown in Table II, the glass is nonhomogeneous, seedy, amber in color, and contained particles which would not melt when melted under the same conditions as Example 18.

Table V characterizes the translucency of Example 18 from Table IV in terms of the percent transmission of visible light radiation.

TABLE II.—PARENT GLASS COMPOSITION

[Parts by weight of oxide nucleant per 100 parts by weight of base glass formulation from Table I]

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Base glass formulation | A | B | C | D | E | F | G | H | A | B | C |
| Parts by weight of oxide per 100 parts by weight of base glass formulation: | | | | | | | | | | | |
| Tin oxide (as SnO₂) | 5 | 5 | 5 | 5 | 5 | 5 | 5 | 5 | 8 | 8 | 8 |
| TiO₂ | | | | | | | | | | | |
| MoO₃ | | | | | | | | | | | |
| Coefficient of thermal expansion, ×10⁷/° C. (0–300° C.) | 59 | 60 | 67 | 70 | 57 | 55 | 51 | 51 | 61 | 52 | 66 |
| Temperature (°C.) at log 13 viscosity | 795 | | | 820 | | | | 865 | | | |

| | Ex. 12 | Ex. 13 | Ex. 14 | Ex. 15 | Ex. 16 | Ex. 17 | Ex. 18 | Control 1 | Control 2 | Control 3 |
|---|---|---|---|---|---|---|---|---|---|---|
| Base glass formulation | D | E | F | G | H | I | I | A | I | 3 |
| Parts by weight of oxide per 100 parts by weight of base glass formulation: | | | | | | | | | | |
| Tin oxide (as SnO₂) | 8 | 8 | 8 | 8 | 8 | ¹3 | ²3 | | | |
| TiO₂ | | | | | | | | 5 | 3 | |
| MoO₃ | | | | | | | | | | 3 |
| Coefficient of thermal expansion ×10⁷/° C. (0–300° C.) | 58 | 54 | 51 | 50 | 61 | | | | 59 | 61 |
| Temperature (° C.) at log 13 viscosity | | | | | 800 | | | | | ³780 |

¹ Batched with stannic oxide.
² Batched with stannous oxide.
³ Glass is yellow in color and quite seedy; difficult to refine.

Table III gives batches for representative Parent Glass Compositions of Table II. A batch is given for preparing Example 8 from both stannic oxide and stannous oxide.

TABLE III.—BATCHES FOR REPRESENTATIVE PARENT GLASS COMPOSITIONS OF TABLE II

| Component | Ex. 1 | Ex. 4 | Ex. 8 | Ex. 8 |
|---|---|---|---|---|
| Silica (Ottawa Flint) | 2,192.9 | 196.1 | 277.3 | 2,313.3 |
| Alumina (A-10 by Alcoa) | 642.1 | 84.8 | 117.2 | 978.2 |
| Barium carbonate (reagent grade J. T. Baker) | 2,465.3 | 369.2 | 226.7 | 1,896.8 |
| Barium dioxide (reagent grade J. T. Baker) | 19.4 | 3.2 | 2.0 | |
| Stannic oxide (Matheson, Coleman & Bell) | 250.0 | 30.0 | 30.0 | |
| Stannous oxide (reagent grade) | | | | 223.4 |

Table IV presents the properties and crystalline phase compositions of glass-ceramics of invention as a function of the crystallization heat treatment.

The control samples, designated Control 1, Control 2, and Control 3, are presented to illustrate the advantages of the present invention over the prior art. Control Examples 1 and 2 illustrate of the useof titania as a nucleant. The data presented demonstrates that the samples remain transparent and no detectable amount of crystalline phase is present when the samples are subjected to the designated crystallization heat treatment.

Control Sample 3 illustrates that molybdenum oxide

TABLE V

Visible transmission of Example 18 per 0.536 cm. thickness

Wavelength (micron):      Transmittance (percent)
0.7 _____ 38
0.6 _____ 26
0.5 _____ 14
0.4 _____ 4

Table VI, Table VII, and Table VIII show how the heat treatment affects the coefficient of expansion and light transmission characteristics of glass-ceramic articles produced from the Parent Glass Composition of Example 1 and Example 8. In Table VIII, the samples are translucent to opaque.

In general, it can be said that Table VI shows that the coefficient of expansion generally increases as the duration and temperature of heat treatment increases. It appears that the resulting glass-ceramic article initially proceeds through a stage of translucency, then becomes clear and then becomes more opaque as the heat treatment progresses. Table VI, Table VII, and Table VIII thus illustrate how to select the appropriate heat treatment to achieve the desired combination of thermal expansion and transparency, translucency or opacity in the finished glass-ceramic article.

TABLE VI.—HEAT TREATMENT AND PROPERTIES OF GLASS-CERAMICS FOR EXAMPLE 1

[Preliminary heat treatment at 760° C. for 16 hours and then 1,017° C. for 1 hour]

| Finishing heat treatment, ° C. (hours) | Crystalline phases | | Appearance | C. of T.E., ×10⁷/° C. (0–300° C.) |
|---|---|---|---|---|
| | Principal | Minor | | |
| 954(2.5) | Hexacelsian | | Translucent | 69 |
| 954(4) | do | | do | 70 |
| 954(8) | do | | do | 71 |
| 954(72) | do | | Transparent | 76 |
| 954(120) | do | | do | 76 |
| 954(240) | do | | Translucent | 78 |
| 954(480) | do | Beta cristobalite | Opaque | 93 |
| 1,010(2) | do | | Translucent | 70 |
| 1,010(4) | do | | do | 71 |
| 1,010(8) | do | | do | 73 |
| 1,010(16) | do | | do | 74 |
| 1,010(56) | do | | Transparent | 76 |
| 1,010(120) | do | | do | 78 |
| 1,010(224) | do | | Murky | 79 |
| 1,177(2) | do | | Translucent | 73 |
| 1,177(4.7) | do | | do | 73 |
| 1,177(8) | do | | do | 74 |
| 1,177(16) | do | | do | 75 |
| 1,177(88) | do | | Transparent | 76 |

TABLE VII.—HEAT TREATMENT AND PROPERTIES OF GLASS-CERAMICS FOR EXAMPLE 1

[Preliminary heat treatment at 760° C. for 16 hours and then 1,017° C. for 1 hour]

| Finishing heat treatment, ° C. (hours) | Appearance | C. of T.E., ×10⁷/° C. (0–300° C.) |
|---|---|---|
| 954(4) + 500(4) | Translucent | 69 |
| 954(4) + 500(16) | do | 69 |
| 954(4) + 500(64) | do | 69 |
| 954(4) + 500(240) | do | 69 |
| 954(4) + 500(496) | do | 69 |
| 954(4) + 500(1,008) | do | 68 |
| 954(72) + 500(4) | Transparent | 76 |
| 954(72) + 500(16) | do | 74 |
| 954(72) + 500(64) | do | 74 |
| 954(72) + 500(240) | do | 73 |
| 954(72) + 500(496) | do | 75 |
| 954(72) + 500(1,008) | do | 76 |

TABLE VIII.—HEAT TREATMENT AND PROPERTIES OF GLASS-CERAMICS FOR EXAMPLE 8

[Preliminary heat treatment at 732° C. for 5 hours and then 1,903° C. for 1 hour]

| Finishing heat treatment, ° C. (hours) | Crystalline phases | | C. of T.E., ×10⁷/° C. (0–300° C.) |
|---|---|---|---|
| | Principal | Minor | |
| None | Hexacelsian | | 58 |
| 927(1) | do | | 61 |
| 927(2) | do | | 93 |
| 927(4) | do | | 120 |
| 927(8) | do | | 138 |
| 927(16) | do | | 146 |
| 927(32) | do | | 152 |
| 927(64) | do | | 155 |
| 927(120) | do | | 162 |
| 927(256) | do | | 162 |
| 927(507) | do | | 168 |
| 1,093(1) | do | Beta cristobalite and alpha quartz | 118 |
| 1,093(2) | do | | 129 |
| 1,093(4) | do | | 138 |
| 1,093(8) | do | | 146 |
| 1,093(16) | do | | 150 |
| 1,093(32) | do | | 155 |
| 1,093(64) | do | Beta cristobalite and alpha quartz | 159 |
| 1,093(128) | do | | 161 |
| 1,093(256) | do | | 165 |
| 1,093(512) | do | | 167 |
| 927(1) | do | | 61 |
| 927(1) + 500(4) | do | | 62 |
| 927(1) + 500(16) | do | | 60 |
| 927(1) + 500(64) | do | | 62 |
| 927(1) + 500(240) | do | | 62 |
| 927(1) + 500(480) | do | | 60 |
| 927(1) + 500(1,008) | do | | 60 |
| 927(4) | do | | 120 |
| 927(4) + 500(4) | do | | 120 |
| 927(4) + 500(16) | do | | 117 |
| 927(4) + 500(64) | do | | 119 |
| 927(4) + 500(240) | do | | 120 |
| 927(4) + 500(480) | do | | 122 |
| 927(4) + 500(1,008) | do | | 120 |

Table IX and Table X illustrate how the electrical properties of the glass-ceramic article can be varied as a functional of heat treatment.

The dielectric constants of the glass-ceramics of invention are in the neighborhood of 8 to 10. The data indicates that the dielectric constants of the glass-ceramics are almost independent of frequency.

The dielectric losses of the glass-ceramics are relatively low. The dissipation factor (tan $\delta$) is a measure of the dielectric loss. There is some spread in the data presented in Table IX because the tan $\delta$ of these glass-ceramics are too low to measure accurately. The data does indicate, however, that the dissipation factor tends to decrease as frequency increases.

It is important to note that the dissipation factor of the glass-ceramics is low and the dielectric constant is frequency-independent which makes these glass-ceramics useful as dielectric substrates. As a frame of reference, alumina which is used extensively as substrate in moderate power, low frequency, integrated circuits has a dielectric constant of about 9 and a dissipation factor (tan $\delta$) of about $4\times10^{-4}$ at 1 mHz. The glass-ceramics have an advantage over the alumina in glass formability, transparency, and controllability of thermal coefficient of expansion.

TABLE IX.—ELECTRICAL PROPERTIES OF GLASS CERAMICS FOR EXAMPLE 1 AS A FUNCTION OF HEAT TREATMENT

[Measured at 25° C.]

| Heat treatment, ° C. (hours) | Frequency (mHz.) | Dielectric constant | Tan $\delta$ ×10⁴ | AC resistivity ×10⁻⁹ |
|---|---|---|---|---|
| 804(2) + 1,066(1) | 1.0 | 8.56 | 18.98 | 0.1107 |
| | 0.5 | 8.53 | 15.88 | 0.2656 |
| | 0.1 | 8.55 | 11.58 | 1.817 |
| | 0.05 | 8.56 | 8.33 | 5.046 |
| | 0.01 | 8.57 | 4.62 | 45.42 |
| | 0.005 | 8.58 | 9.24 | 45.42 |
| 804(2) + 1,066(1) + 1204(1) | 0.5 | 10.20 | 3.45 | 1.022 |
| | 0.1 | 10.22 | 12.5 | 1.405 |
| | 0.05 | 10.24 | 3.12 | 11.242 |
| | 0.01 | 10.26 | 15.6 | 11.242 |
| | 0.005 | 10.27 | 31.17 | 11.242 |
| 760(16) + 1,010(1) + 954(4) | 1.0 | 8.23 | 10.20 | 0.21 |
| | 0.5 | 8.21 | 5.00 | 0.87 |
| | 0.1 | 8.21 | 7.04 | 3.11 |
| | 0.05 | 8.21 | 8.38 | 5.23 |
| | 0.01 | 8.22 | 5.04 | 43.58 |
| | 0.005 | 8.22 | 3.35 | 130.74 |
| 760(16) + 1,010(1) + 954(72) | 1.0 | 8.20 | 9.99 | 0.22 |
| | 0.5 | 8.17 | 5.47 | 0.81 |
| | 0.1 | 8.18 | 7.64 | 2.88 |
| | 0.05 | 8.19 | 7.80 | 5.64 |
| | 0.01 | 8.19 | 6.78 | 32.40 |
| | 0.005 | 8.20 | 3.39 | 129.61 |

TABLE X.—ELECTRICAL PROPERTIES OF GLASS-CERAMICS FOR EXAMPLE 8 AS A FUNCTION OF HEAT TREATMENT

[Measured at 25° C.]

| Heat treatment, ° C. (hours) | Frequency (mHz.) | Dielectric constant | Tan $\delta$ ×10⁴ | AC resistivity ×10⁻⁹ |
|---|---|---|---|---|
| 732(5) + 1,093(1) + 927(1) | 1.0 | 8.92 | 9.93 | 0.203 |
| | 0.5 | 8.99 | 6.74 | 0.594 |
| | 0.1 | 9.02 | 9.54 | 2.091 |
| | 0.05 | 9.03 | 10.5 | 3.798 |
| | 0.01 | 9.04 | 11.04 | 18.039 |
| 732(5) + 1,093(1) + 927(2) | 1.0 | 9.18 | 13.99 | 0.140 |
| | 0.5 | 9.26 | 11.73 | 0.331 |
| | 0.1 | 9.28 | 15.16 | 1.279 |
| | 0.05 | 9.29 | 14.48 | 2.675 |
| | 0.01 | 9.33 | 19.67 | 9.809 |
| | 0.005 | 9.32 | 21.01 | 18.39 |
| 732(5) + 1,093(1) + 927(4) | 1.0 | 7.80 | 8.393 | 0.275 |
| | 0.5 | 7.89 | 4.417 | 1.033 |
| | 0.1 | 7.90 | 6.567 | 3.468 |
| | 0.05 | 7.90 | 5.947 | 7.667 |
| | 0.01 | 7.91 | 3.124 | 72.833 |
| | 0.005 | 7.90 | 3.130 | 145.665 |
| 732(5) + 1,093(1) + 927(6) | 1.0 | 8.38 | 9.93 | 0.216 |
| | 0.5 | 8.35 | 5.07 | 0.850 |
| | 0.1 | 8.36 | 11.76 | 1.831 |
| | 0.05 | 8.36 | 11.42 | 3.768 |
| | 0.01 | 8.37 | 13.04 | 16.484 |
| | 0.005 | 8.38 | 16.30 | 26.374 |

To illustrate the high strength properties of the glass-ceramics of invention, several heat treatments are provided for Example 1 and Example 8 and the modulus of rupture of the heat treated glass-ceramics are obtained. The modulus of rupture of the parent glass is also reported for the purpose of comparison. One-quarter inch diameter cane samples are used in the testing. Several samples are averaged for each value reported and the standard deviation is also presented.

These data are presented in Table XI wherein the modulus of rupture was obtained using 4-point loading in a conventional testing apparatus. The abraded samples were tumbled in a ball mill for 5 to 10 minutes with a fine silicon carbide abrasive.

This test data indicates that the strength of the glass-ceramic articles is substantially improved over the parent glass. Furthermore, it is apparent that this strength is retained even after abrasion.

TABLE XI.—MODULUS OF RUPTURE PROPERTIES FOR EXAMPLES 1 AND 8

| Ex. | Heat treatment temp., °C. (hrs.) | Modulus of rupture, p.s.i. (standard deviation) | |
|---|---|---|---|
| | | Abraded | Unabraded |
| 1 | None—parent glass | 12,000(500) | 16,700(2,600) |
| | 760(16) + 1,010(1) + 954(4) | 15,200(900) | 18,600(1,900) |
| | 760(16) + 1,010(1) + 954(72) | 18,300(500) | 24,400(2,500) |
| 8 | None—parent glass | 14,600(800) | 16,100(2,500) |
| | 732(5) + 1,093(1) + 927(1) | 19,800(700) | |
| | 732(5) + 1,093(1) + 927(2) | 35,800(2,400) | 39,800(2,700) |
| | 732(5) + 1,093(1) + 927(4) | 37,700(1,900) | 32,700(10,500) |

From the foregoing, it is apparent that the present invention provides for the nucleation and crystallization of certain barium aluminosilicate glasses to form transparent, translucent, and opaque glass-ceramic articles having a coefficient of expansion controllable within the range of 50 to $170 \times 10^{-7}/°$ C. (0–300° C.).

Furthermore, it is apparent that the present invention provides for glass-ceramic articles having dielectric constants in the neighborhood of 8 to 10 and dissipation factors which are quite low. High strength characteristics are also achieved in the glass-ceramic articles as demonstrated by the high modules of rupture values in both the abraded and unabraded states.

Having thus described the invention, what is claimed is:

1. A homogeneous glass composition consisting essentially of a base glass formulation and tin oxide as the sole essential nucleant, said tin oxide being present in the proportion of about 0.1–10 parts by weight per 100 parts by weight of said base glass formulation when expressed as $SnO_2$, said base glass formulation consisting of the following components in the following weight percentages:

| | Percent |
|---|---|
| BaO | 27.5–52 |
| $Al_2O_3$ | 12–22 |
| $SiO_2$ | 33–50 | said components being present in the following weight proportions:

$$\frac{BaO}{Al_2O_3} \leq 3.58$$

$$2.25 \leq \frac{SiO_2}{Al_2O_3} \leq 3.75$$

2. The composition of claim 1 wherein said tin oxide is present in the proportion of about 1 to about 8 parts my weight per 100 parts by weight of said base glass formulation.

3. The composition of claim 1 wherein said base glass formulation consists of the following components in the following weight percentages:

| | Percent |
|---|---|
| BaO | 27.5–52 |
| $Al_2O_3$ | 12–22 |
| $SiO_2$ | 33–50 |

4. The method for forming a glass-ceramic article having a coefficient of thermal expansion in the range of from 50 to $170 \times 10^{-7}/°$ C. over the range of 0–300° C. comprising shaping said article from a glass composition consisting essentially of a base glass formulation and tin oxide as the sole essential nucleant, said tin oxide being present in the proportion of about 0.1–10 parts by weight per 100 parts by weight of said base glass formulation when expressed as $SnO_2$, said base glass formulation consisting of the following components in the following weight percentages:

| | Percent |
|---|---|
| BaO | 27.5–52 |
| $Al_2O_3$ | 12–22 |
| $SiO_2$ | 33–50 | said components being present in the following weight proportions:

$$\frac{BaO}{Al_2O_3} \leq 3.58$$

$$2.25 \leq \frac{SiO_2}{Al_2O_3} \leq 3.75$$

and heat treating said article at a temperature and for a time sufficient to in-situ crystallize a dispersion of randomly oriented fine crystals of hexacelsian as the principal crystalline phase in a residual glassy matrix.

5. The method of claim 4 wherein said time ranges from ¼ hour to 100 hours and said temperature ranges from 500° C. to 1200° C.

6. The method of claim 4 wherein said glass composition consists of the following components in the following weight percentages:

| | Percent |
|---|---|
| BaO | 30–43 |
| $Al_2O_3$ | 12–22 |
| $SiO_2$ | 45–50 |

7. The method of claim 4 wherein cristobalite is present as a minor crystalline phase.

8. The product of the process of claim 4.

9. The product of the process of claim 5.

References Cited

UNITED STATES PATENTS

| 3,236,662 | 2/1966 | MacDowell | 65—33 X |
| 3,445,209 | 5/1969 | Asonmaa | 65—33 |
| 3,531,303 | 9/1970 | Bahat | 65—33 |
| 3,720,526 | 3/1973 | Duke et al. | 65—33 |
| 3,467,534 | 9/1969 | MacDowell | 65—33 |

S. LEON BASHORE, Primary Examiner

F. W. MIGA, Assistant Examiner

U.S. Cl. X.R.

65—33, 134; 106—39.5, 52

UNITED STATES PATENT OFFICE
CERTIFICATE OF CORRECTION

Patent No. 3,837,978      Dated September 24, 1974

Inventor(s) Robert A. Busdiecker

It is certified that error appears in the above-identified patent and that said Letters Patent are hereby corrected as shown below:

Col. 4, line 41, "Sxamples" should read -- Examples --.

Col. 6, line 40, "Control" last occurrence should read -- Control 3 --.

Col. 6, line 41 "3" should read --- I ---.
Col. 7, line 5 "1,017°C" should read --- 1,010°C ---.
Col. 7, line 26 "1,017°C" should read --- 1,010°C ---.
Col. 7, line 42 "1,903°C" should read --- 1,093°C ---.
Col. 10, line 5 "27.5 - 52" should read --- 30 - 43 ---.
Col. 10, line 7 "33 - 50" should read --- 45 - 50 ---.

Signed and sealed this 11th day of March 1975.

(SEAL)
Attest:

RUTH C. MASON
Attesting Officer

C. MARSHALL DANN
Commissioner of Patents
and Trademarks